United States Patent [19]

Glennon

[11] Patent Number: 4,730,243
[45] Date of Patent: Mar. 8, 1988

[54] EMI REDUCTION CIRCUIT

[75] Inventor: Timothy F. Glennon, Rockford, Ill.

[73] Assignee: Sundstrand Corporation, Rockford, Ill.

[21] Appl. No.: 812,746

[22] Filed: Dec. 23, 1985

[51] Int. Cl.⁴ .............................................. H02M 1/14
[52] U.S. Cl. ....................................... 363/44; 363/86; 363/126
[58] Field of Search ...................... 363/41, 44, 85, 86, 363/87, 89, 90, 126, 127; 323/910

[56] References Cited

U.S. PATENT DOCUMENTS

| | | | |
|---|---|---|---|
| 3,909,700 | 9/1975 | Ferro | 363/127 X |
| 4,053,820 | 10/1977 | Peterson et al. | 363/44 |
| 4,131,844 | 12/1978 | Hucker et al. | 323/263 |
| 4,143,414 | 3/1979 | Brewster et al. | 363/44 |
| 4,302,717 | 11/1981 | Olla | 363/89 X |
| 4,366,532 | 12/1982 | Rosa et al. | 363/69 |
| 4,390,831 | 6/1983 | Byrd et al. | 363/86 X |
| 4,412,277 | 10/1983 | Mitchell | 363/89 X |
| 4,460,950 | 7/1984 | Finney | 363/44 |
| 4,520,437 | 5/1985 | Boettcher, Jr. et al. | 363/41 |

Primary Examiner—Patrick R. Salce
Assistant Examiner—Marc S. Hoff
Attorney, Agent, or Firm—Wood, Dalton, Phillips, Mason & Rowe

[57] ABSTRACT

Prior types of power conversion circuits for converting AC power into DC power have generated large amounts of undesirable electromagnetic interference (EMI) due to the rectification of the AC power. Such EMI has been reduced in the past by large and heavy filters which have undesirably increased the size and weight of such conversion circuits. In order to overcome this problem, a harmonic reduction circuit according to the present invention includes a current sensor for sensing the current in the AC lines, circuitry for developing a pulse width modulated (PWM) waveform having a duty cycle dependent upon the sensed AC line current and a switching circuit coupled to the AC power line and controlled by the PWM waveform developing circuitry for compensating the AC line current whereby undesired harmonics therein are reduced.

25 Claims, 7 Drawing Figures

EMI REDUCTION CIRCUIT

DESCRIPTION

1. Technical Field

The present invention relates generally to electromagnetic interference reduction circuits and more particularly to circuitry for reducing harmonics in AC power lines caused by rectification of AC power carried thereby.

2. Background Art

Often, AC power from a generator or another AC source is rectified by a rectifier circuit to develop DC power. However, operation of the rectifier circuit causes high-amplitude harmonics to be developed on the AC power lines. These harmonics in turn generate electromagnetic interference which can adversely affect the operation of components in the vicinity of the power lines. In some installations the degree of electromagnetic interference may be considered unacceptable and must therefore be reduced.

In the past, harmonic currents have been limited by the use of a large filter connected in the AC power lines. However, in installations, such as in aircraft, where space is at a premium and where weight must be minimized, this has been found to be a poor solution to the problem.

One type of circuit for filtering undesired harmonics on an AC power line is disclosed in Peterson et al U.S. Pat. No. 4,053,820. This patent discloses a harmonic converter and a plurality of filters which together generate currents that are combined with the currents carried by the AC power lines to cancel the harmonics therein. The harmonic converter comprises a first rectifier bridge coupled to the AC power lines for rectifying the AC power and a second plurality of controlled rectifiers for inverting the rectified AC power to derive injected currents which are combined with the line currents.

A further type of harmonic reduction circuit is disclosed in Finney U.S. Pat. No. 4,460,950. This patent discloses a controlled bridge rectifier wherein two or more three-phase thyristor bridges are connected in parallel with one another between an AC supply and a DC output by means of interphase transformers. The thyristors of each bridge are controlled so that the harmonic content in the current drawn from the AC supply is reduced.

Additional harmonic reduction circuits are disclosed in Rosa et al U.S. Pat. No. 4,366,532 and Brewster et al U.S. Pat. No. 4,143,414.

3. Disclosure of Invention

In accordance with the present invention, a harmonic reduction circuit reduces harmonics on AC power lines coupled to a rectifier so that the size of the filter in the line may be reduced.

The harmonic reduction circuit includes means for sensing the current in the AC power line, means for developing a pulse width modulated (PWM) waveform having a duty cycle dependent upon the sensed AC line current and a switching circuit coupled to the AC power line and controlled by the PWM waveform developing means for compensating the AC line current whereby undesired harmonics therein are reduced.

The developing means includes means for generating a reference sine wave, means for summing a current signal representing the sensed AC line current with the reference sine wave to develop an error signal and means for deriving the PWM waveform from the error signal. The deriving means in turn includes means for summing the error signal with a constant amplitude triangle wave to develop a modified error signal and a comparator for comparing the modified error signal with a reference signal to derive the PWM waveform.

The switching circuit includes a transformer having a primary winding coupled to at least one switch which is controlled by the PWM waveform and a secondary winding coupled in the AC power line. The switch is controlled to compensate for variations in the line current caused by rectification thereof.

The harmonic reduction circuit of the instant invention is equally applicable to single phase and polyphase systems and is implemented in a simple and inexpensive fashion.

BEST MODE FOR CARRYING OUT THE INVENTION

Figure 1:
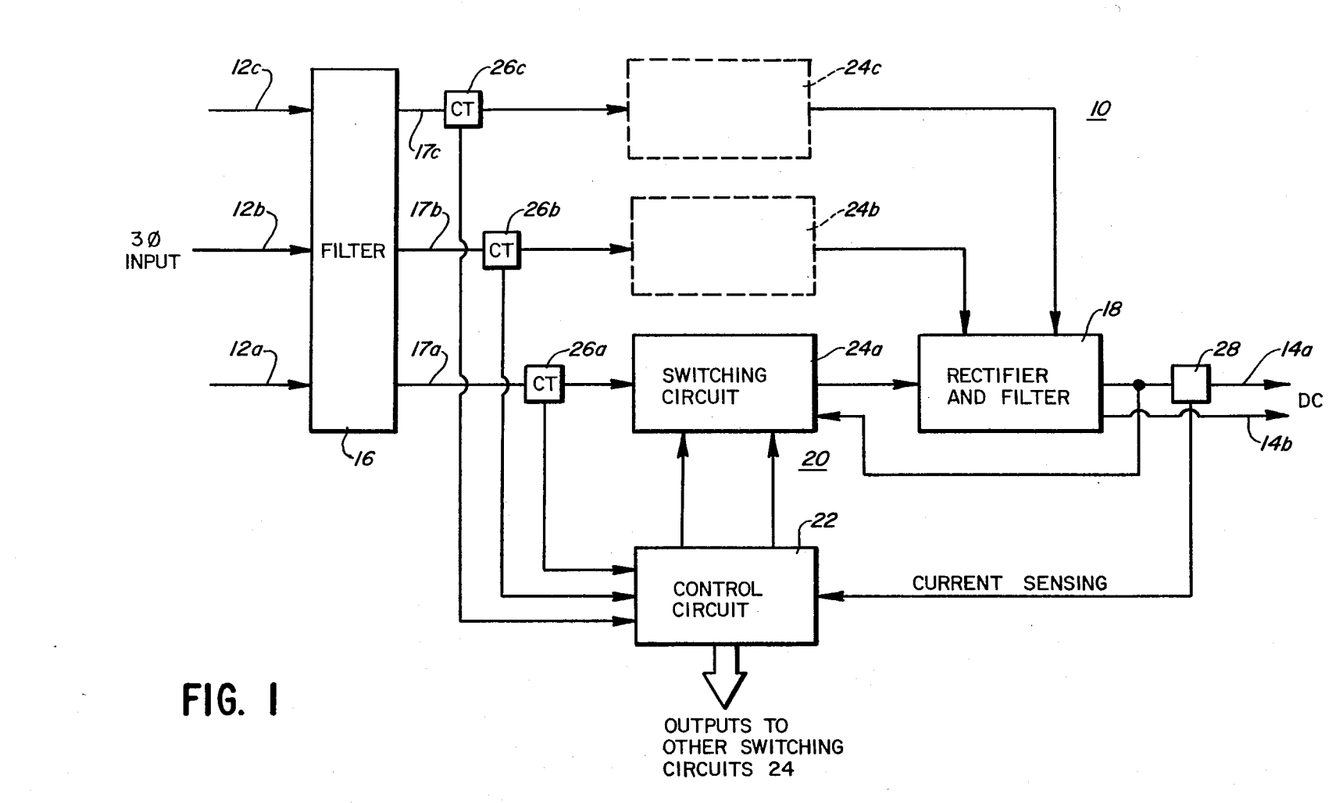
FIG. 1 is a block digram of a power conversion system in conjunction with the harmonic reduction circuit of the present invention.

Referring now to FIG. 1, there is illustrated a power conversion system 10 for converting AC power on AC power lines 12 into DC power on lines 14a, 14b. In the embodiment illustrated, the AC power includes three phases carried on power lines 12a–12c. It should be noted, however, that the instant invention is equally applicable to single phase or N-phase power, where N is an integer.

The AC power on the power lines 12 is coupled to a filter 16 and thence over lines 17a–17c to a rectifier and filter circuit 18 which converts the polyphase AC power into the DC power on the lines 14a, 14b.

High-amplitude harmonics are typically generated on the AC power lines 12 due to the rectification of the AC power by the circuit 18. These harmonics are reduced by means of an EMI or harmonic reduction circuit 20 according to the present invention in conjunction with the filter 16. The harmonic reduction circuit includes a control circuit 22, discussed in greater detail hereinafter in connection with FIGS. 3–5, that operates N switching circuits which, in the preferred embodiment, comprise three circuits 24a–24c. The control circuit 22 receives current signals developed by N current transformers 26 representing the currents in the AC power lines 12.

The control circuit 22 also receives a signal from a current sensor 28 that detects the current at the output of the rectifier and filter circuit 18.

Figure 2:
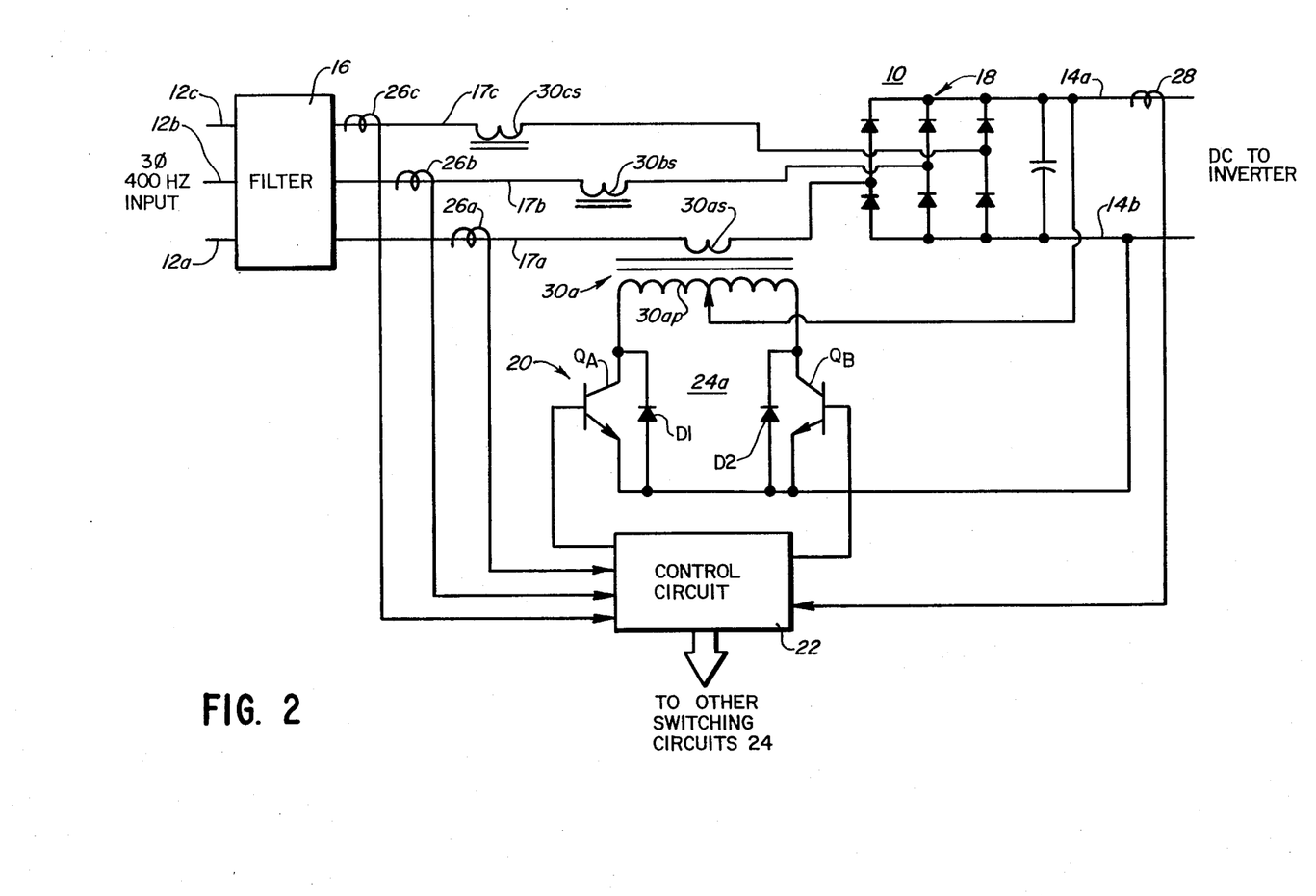
FIG. 2 is a partial schematic and partial block diagram of the system shown in FIG. 1.

Referring now to FIG. 2, there is illustrated in greater detail the harmonic reduction circuit 20 and the power conversion system 10.

All of the N switching circuits 24 are identical, and hence only the switching circuit 24a is shown and described in detail. The switching circuit 24a includes first and second power switches comprising transistors $Q_A$ and $Q_B$ which are coupled to first and second ends of a primary winding 30ap of a transformer 30a. The transformer primary winding 30ap also includes a mid-tap which is coupled to the line 14a at the output of the rectifier and filter circuit 18.

It can be seen that the AC power on the lines 12 together with the rectifier and filter circuit 18 comprises a source of DC power for the switching circuit 24a. Of course, the switching circuits 24 may be coupled to a different source of DC power, if desired.

Coupled across each of the transistors $Q_A, Q_B$ is a diode D1, D2, respectively. The emitters of the transistors $Q_A, Q_B$ are coupled together to the line 14b.

Generally, the switches $Q_A$ and $Q_B$ are operated in a fashion described more specifically below to derive compensating power which is combined by means of a secondary winding 30as of the transformer 30a with the power on the line 17a to minimize the harmonics therein.

Figure 3:
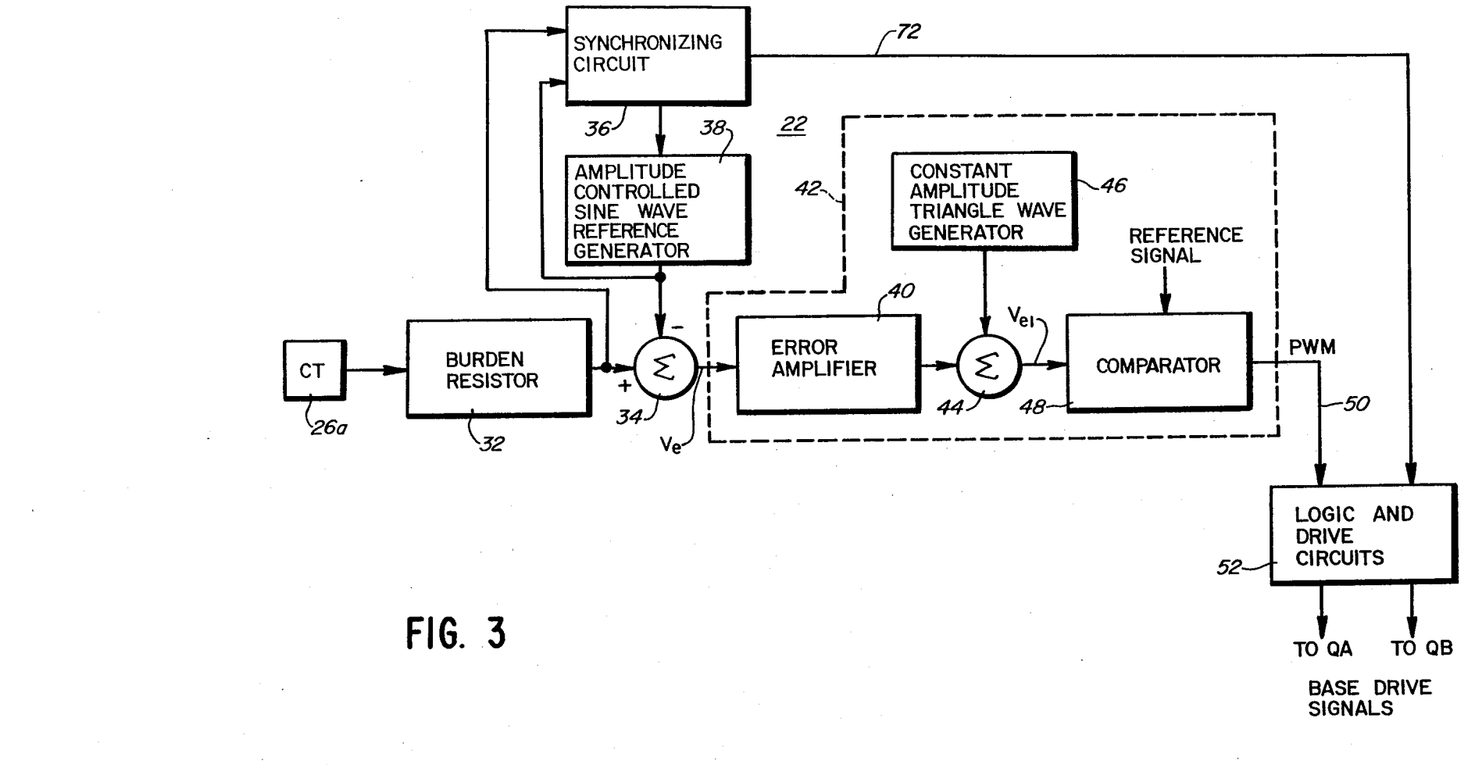
FIG. 3 is a block diagram of the control circuit shown in FIG. 2.

Referring now to FIG. 3, there is illustrated in greater detail the control circuit 22 shown in block diagram form in FIGS. 1 and 2.

The portion of the control circuit 22 illustrated in FIG. 3 is the circuitry required to generate control signals for operating the switches $Q_A, Q_B$ in the switching circuit 24a. Additional circuitry identical to that shown in FIG. 3 generates the control signals for the switches in the remaining switching circuits 24b and 24c.

The control circuit 22 receives the current signal representing the current in the line 17a from sensing means comprising the current transformer 26a and a burden resistor 32. The burden resistor 32 is in turn coupled to first summing means comprising a summing junction 34. The summing junction 34 sums the current signal with a reference sine wave developed by sine wave generating means comprising a synchronizing circuit 36 and an amplitude controlled sine wave reference generator 38. The synchronizing circuit 36 receives the current signal from the burden resistor 32 and a feedback signal from the output of the sine wave reference generator 38 and controls the phase of the reference sine wave so that it is in phase with the fundamental frequency component of the AC power on the line 17a.

The first summing means develops an error signal $V_e$ representing the difference between the current signal and the reference sine wave. The error signal $V_e$ is coupled to an error amplifier 40 in a pulse width modulator circuit 42. The error amplifier is in turn coupled to second summing means comprising a summing junction 44 which receives a second input from a constant amplitude triangle wave generator 46. The summing junction 44 sums the amplified error signal $V_e$ with the constant amplitude triangle wave from the generator 46 to derive a modified error signal $V_{e1}$.

The output of the second summing means is coupled to a comparator 48 which compares the modified error signal $V_{e1}$ with a reference signal to derive a PWM error signal on a line 50.

It can be seen that the circuitry represented by the blocks 40, 44, 46, 48 together comprise means for deriving a pulse width modulated signal from the error signal $V_e$.

Further, the circuitry comprising the elements 34–38 comprises means for developing a pulse width modulated wave on the line 50 having a duty cycle dependent generally upon the AC line current, and more specifically upon the error between the sensed AC line current in the line 17a and the reference sine wave.

The line 50 is coupled to logic and drive circuits 52 which are a part of the switching circuit 24a. The logic and drive circuits receive a synchronizing signal from an output of the synchronizing circuit 36, as described in greater detail hereinafter.

The logic and drive circuits 52 operate the switches $Q_A, Q_B$ in accordance with the PWM error signal on the line 50 so that appropriate harmonic current compensation is provided via the switching circuit 24a to the power line 17a.

Figure 4:
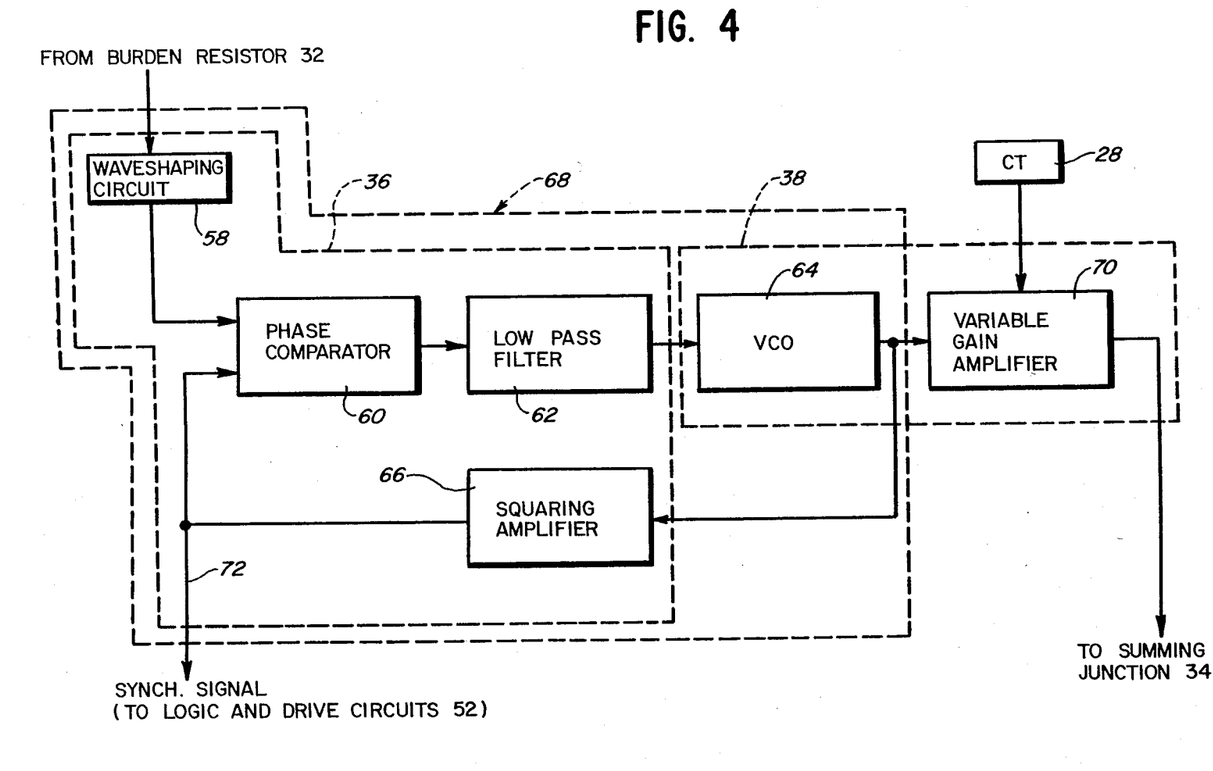
FIG. 4 is a block diagram of the synchronizing circuit and sine wave reference generator shown in FIG. 3.

Referring now to FIG. 4, there is illustrated in greater detail the circuitry represented by the blocks 36 and 38 in FIG. 3. The synchronizing circuit 36 includes a waveshaping circuit 58 which converts the signal developed across the burden resistor 32 into a square wave which is coupled to a first input of a phase comparator 60. An output of the phase comparator 60 is connected to a low pass filter 62 which is in turn coupled to a voltage controlled oscillator, or VCO 64 in the sine wave reference generator 38. The output of the VCO 64 is coupled via a squaring amplifier 66 in the synchronizing circuit 36 to a second input of the phase comparator 60. The circuits 60, 62, 64, 66 together comprise a phase-locked loop or PLL 68 having a first output which is coupled to a variable-gain amplifier 70 in the sine wave reference generator 38. The variable-gain amplifier varies the magnitude of the alternating current signal from the VCO 64 in accordance with the output current from the rectifier and filter circuit 18 as detected by the current sensor 28. The variable-gain amplifier 70 affords control over output current by varying the magnitude of the reference sine wave coupled to the second input of the first summing means 34.

Figure 5:
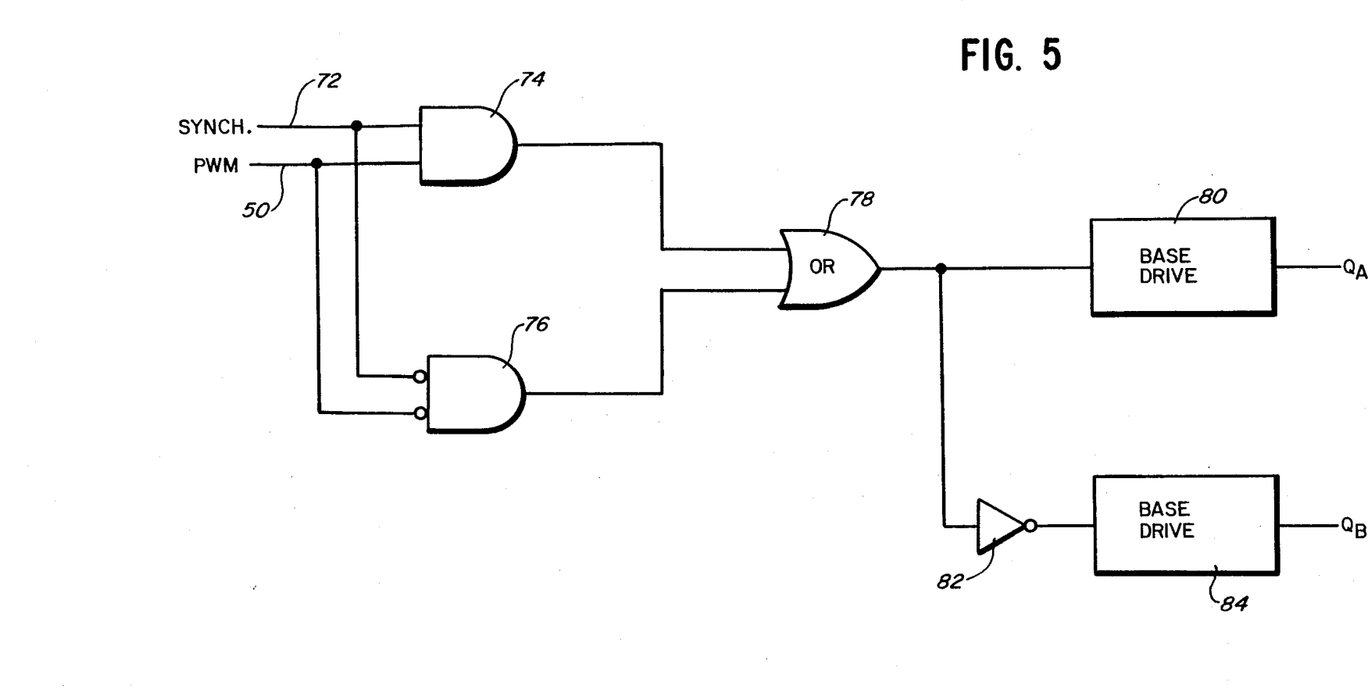
FIG. 5 is a combined logic and block diagram of the logic and drive circuits shown in FIG. 3.

The signal from the synchronizing circuit 36 to the logic and drive circuits 52 is obtained at a second output of the PLL 68 on a line 72 coupled to the squaring amplifier 66. As seen in FIG. 5, the synchronizing signal on the line 72 and the PWM error signal on the line 50 are coupled to noninverting inputs of a first AND gate 74.

A second AND gate 66 includes an inverting input coupled to the second output of the PLL 68 over the line 72 and an inverting input coupled to the PWM waveform on the line 50. The outputs of the AND gate 74 and 76 are coupled to first and second noninverting inputs of an OR gate 78. The OR gate 78 includes an output which is coupled by a base drive circuit 80 to the base or control electrode of the power switch $Q_A$. The output of the OR gate 78 is further coupled by means of an inverter 82 and a base drive circuit 84 to the base or control electrode of the power switch $Q_B$.

The gates shown in FIG. 5 synchronize the operation of the switches $Q_A, Q_B$ so that these switches are operated in appropriate fashion to develop the necessary compensating power.

Figure 6:
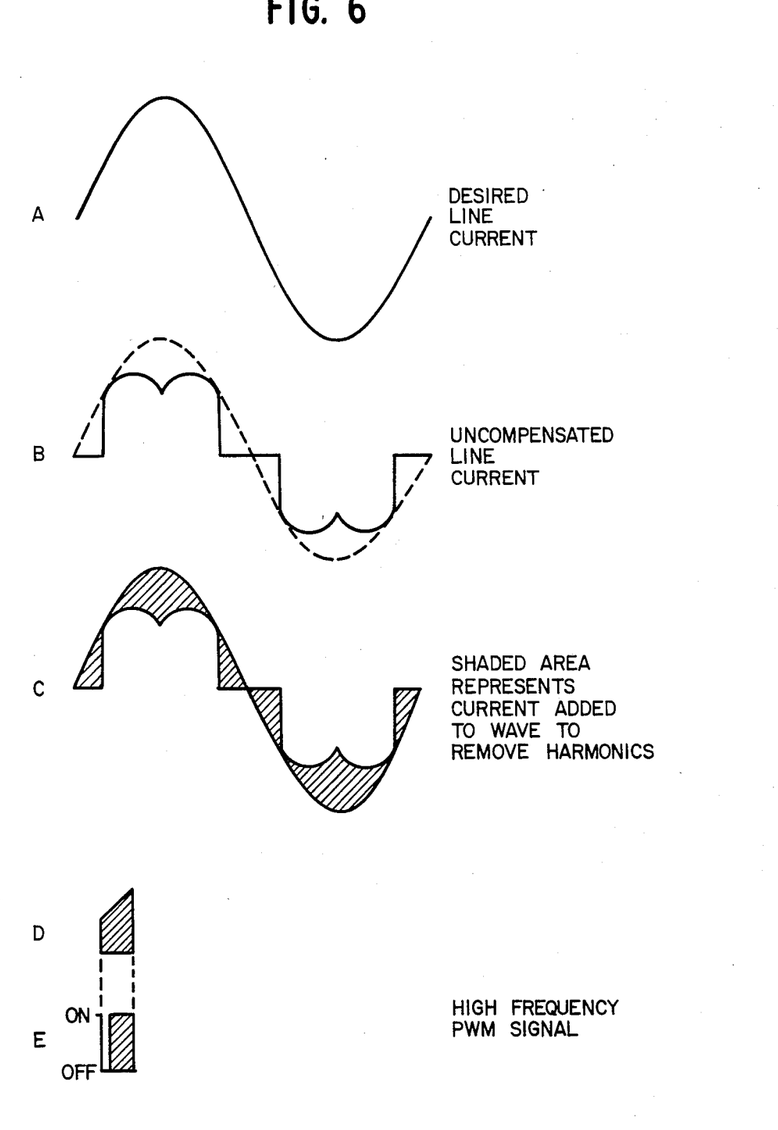
FIG. 6 is a series of waveform diagrams illustrating the operation of the instant invention.

Referring now to FIG. 6, the waveform A illustrates the desired line current in the power line 17a. The waveform B illustrates the current in the power line 17a which results from operation of the rectifier circuit 18 in the absence of compensation by the switching circuit 24a.

The waveform C illustrates the resultant current which is added to the uncompensated line current shown as waveform B to remove the undesired harmonics on the line 17a. A fragment of the waveform C is enlarged in waveform D to illustrate a portion of the current which is added to the line current on the line 17a. The portion of the compensating current shown as waveform D is produced by operation of the switch $Q_A$ as shown by waveform E. In general, the switch $Q_A$ is operated so that the area under the pulse representing the operation of this switch as shown in waveform E equals the area under the pulse shown in waveform D. This ensures that the switching circuit 24a develops the appropriate amount of compensating current to compensate for the harmonics in the line current on the line 17a.

It can be seen that the circuits 40-52 and the transistors $Q_A$ and $Q_B$ together comprise means for deriving compensating current from the error signal $V_e$ while the transformer 30 comprises means for combining the compensating current with the AC current to reduce the harmonics therein.

In the embodiment just described, circuits duplicative of that shown in FIG. 3 are required to operate the remaining switching circuits 24b, 24c. The parts count of the overall system can be reduced by using the circuit shown in FIG. 7 whereby certain components are shared by the controls for the switching circuits 24a-24c.

Figure 7:
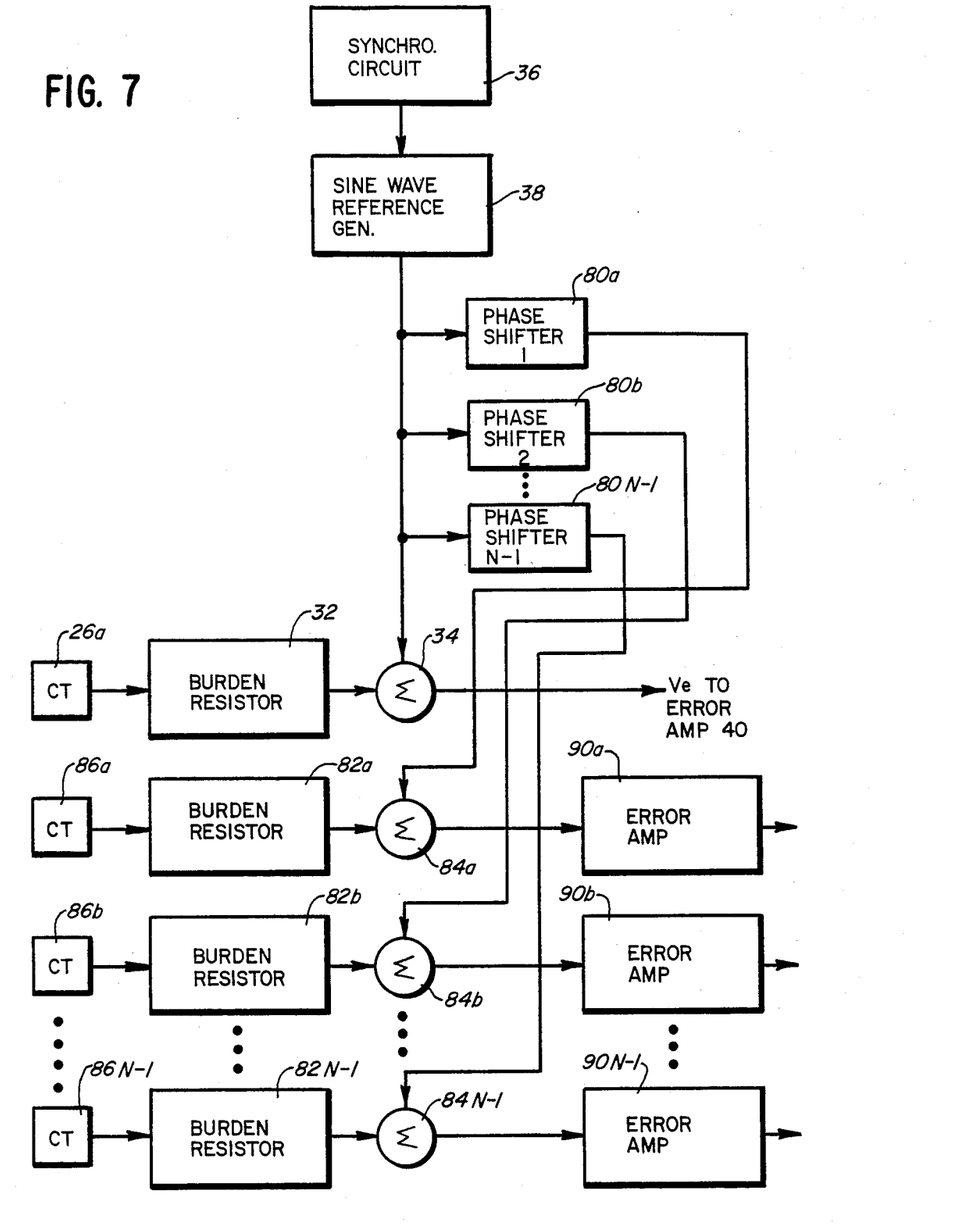
FIG. 7 is a block diagram illustrating an alternative embodiment of the instant invention.

More specifically, the synchronizing circuit 36 and the sine wave reference generator 38 are coupled to $N-1$ phase shifters $80_a, 80_b \ldots 80_{N-1}$, where N is the number of phases of the AC power. As before, the sine wave reference generator 38 is also coupled to the first summing junction 34 for developing the error signal $V_e$ which is coupled to the error amplifier 40. The phase shifters $80_a-80_{N-1}$ are in turn coupled to summing junctions $84_a-84_{N-1}$ which receive current signals from current transformers $86_a-86_{N-1}$ and burden resistors $88_a-88_{N-1}$. The phase shifters 80 shift the phase of the reference signal from the generator 38 by an integer multiple of $2\pi/N$ electrical degrees with respect to the phase of the signal from the reference generator 38. In other words, the reference sine wave generating means comprising the circuits 36 and 38 and the phase shifters 80 together generate a succession of N reference sine waves each displaced $2\pi/N$ electrical degrees with respect to successive reference sine waves. For example, if the AC power is three-phase, the phase shifter $80_a$ develops a sine wave reference which is displaced 120° with respect to the signal from the generator 38 while the phase shifter $80_b$ develops a signal which is shifted in phase 240° with respect to the output of the reference generator 38.

The summing junctions 84 are in turn coupled to error amplifiers $90_a-90_{N-1}$ which are identical to the error amplifier 40. These error amplifiers are coupled to duplicate circuits each of which is identical to the circuits 44,46,48,52 described in connection with FIG. 3.

As seen in FIG. 7, the synchronizing circuit 36 and the sine wave reference generator 38 can thereby be shared to produce the signals for operating the switches in the remaining switching circuits.

In either of the foregoing embodiments, harmonics in the AC power lines are reduced to a significant degree so that the size of the filter 16 can be reduced or the filter eliminated entirely.

I claim:

1. In an AC/DC converter having a rectifier circuit for rectifying AC power from a power source carried by an AC power line to produce DC power, a harmonic reduction circuit for reducing harmonics in the AC power caused by operation of the rectifier circuit, comprising:
   means for sensing the current in the AC power line;
   means for developing a pulse width modulated (PWM) waveform having a duty cycle dependent upon the sensed AC line current; and
   a switching circuit including a transformer having a secondary winding coupled to the AC power line between the power source and the rectifier and a primary winding coupled to at least one switch, the switch being controlled by the PWM waveform developing means for compensating the AC line current whereby undesired harmonics therein are reduced.

2. The harmonic reduction circuit of claim 1, wherein the developing means includes means for generating a reference sine wave, means for summing a current signal representing the sensed AC line current with the reference sine wave to develop an error signal and means for deriving the PWM waveform from the error signal.

3. The harmonic reduction circuit of claim 2, wherein the deriving means comprises a second means for summing the error signal with a constant amplitude triangle wave to develop a modified error signal and a comparator for comparing the modified error signal with a reference signal to derive the PWM waveform.

4. The harmonic reduction circuit of claim 1, wherein the switching circuit includes first and second switches each controlled by the PWM waveform and wherein the primary winding includes first and second ends coupled to the first and second switches, respectively and a mid-tap coupled to the source of DC power.

5. The harmonic reduction circuit of claim 4, wherein the AC power line is coupled to a rectifier circuit which rectifies the AC power to develop DC power and wherein AC power and the rectifier circuit together comprise the source of DC power.

6. The harmonic reduction circuit of claim 2, wherein the reference sine wave generating means comprises a phase-locked loop (PLL) coupled to a variable-gain amplifier.

7. The harmonic reduction circuit of claim 6, wherein the switching circuit includes first and second switches operated by a logic circuit having inputs coupled to the output of the developing means and to the output of the PLL.

8. The harmonic reduction circuit of claim 7, wherein the logic circuit includes a first AND gate having noninverting inputs coupled to the output of the PLL and the PWM waveform, a second AND gate having an inverting input coupled to the output of the PLL and an inverting input coupled to the PWM waveform, an OR gate having noninverting inputs coupled to the outputs of the AND gates and an output coupled to one of the switches, and an inverter having an input coupled to the output of the OR gate and an output coupled to the other of the switches.

9. The harmonic reduction circuit of claim 1, wherein the sensing means comprises a current transformer.

10. An electromagnetic interference (EMI) reduction circuit for reducing harmonics in AC power carried on a power line caused by rectification of the AC power by a rectifier circuit, comprising:

first means for developing a current signal representing the current carried by the AC power line;

second means coupled to the first developing means for developing an error signal from the current signal;

means coupled to the second developing means for deriving compensating current from the error signal; and means coupled to the deriving means and to the power line for combining the compensating current with the AC current to reduce the harmonics therein.

11. The EMI reduction circuit of claim 10, wherein the combining means comprises a transformer having a primary winding which receives the compensating current and a secondary winding coupled to the power line.

12. The EMI reduction circuit of claim 10, wherein the deriving means comprises a logic circuit coupled to the second developing means and a pair of switches coupled between the logic circuit and the combining means.

13. The EMI reduction circuit of claim 12, wherein the combining means comprises a transformer having a primary winding coupled to the switches and a secondary winding coupled in the power line.

14. The EMI reduction circuit of claim 13, wherein the deriving means comprises a pulse width modulator for deriving a pulse width modulated (PWM) waveform from the error signal.

15. The EMI reduction circuit of claim 14, wherein the second developing means includes means for generating a reference sine wave and means for summing the current signal with the reference sine wave to develop the error signal.

16. The EMI reduction circuit of claim 15, wherein the reference sine wave generating means comprises a phase-locked loop (PLL) coupled to a variable-gain amplifier.

17. The EMI reduction circuit of claim 16, wherein the logic circuit includes a first AND gate having noninverting inputs coupled to the output of the PLL and the PWM waveform, a second AND gate having an inverting input coupled to the output of the PLL and an inverting input coupled to the PWM waveform, an OR gate having noninverting inputs coupled to the outputs of the AND gates and an output coupled to one of the switches and an inverter having an input coupled to the output of the OR gate and an output coupled to the other of the switches.

18. The EMI reduction circuit of claim 13, wherein the transformer primary winding includes a mid-tap coupled to a source of DC power.

19. The EMI reduction circuit of claim 18, wherein the source of DC power comprises the AC power and the rectifier circuit which rectifies the AC power to produce DC power.

20. The EMI reduction circuit of claim 10, wherein the first developing means comprises a current transformer for sensing the AC power and a burden resistor coupled to the output of the current transformer, the current signal being developed across the burden resistor.

21. An electromagnetic interference (EMI) reduction circuit for reducing harmonics in N-phase AC power carried on a set of power lines caused by rectification of the N-phase AC power by a rectifier circuit, comprising:

first means for developing a set of N current signals representing the current in each of the power lines;

second means coupled to the first developing means for developing a set of N pulse width modulated (PWM) waveforms from the set of current signals, each waveform having a duty cycle dependent upon the current in an associated one of the power lines, the second developing means including N reference sine wave generating means, N summing junctions each having an input coupled to the output of a reference sine wave generator, a further input which receives one of the current signals and an output which develops an error signal, the PWM waveforms being derived from the error signals; and a plurality of switching circuits, each of which is coupled to an AC power line and controlled by the PWM waveform associated with such power line for compensating the AC line current whereby undesired harmonics therein are reduced.

22. An electromagnetic interference (EMI) reduction circuit for reducing harmonics in N-phase AC power carried on a set of power lines caused by rectification of the N-phase AC power by a rectifier circuit, comprising:

first means for developing a set of N current signals representing the current in each of the power lines;

second means coupled to the first developing means for developing a set of N pulse width modulated (PWM) waveforms from the set of current signals, each waveform having a duty cycle dependent upon the current in an associated one of the power lines, the second developing means including means for generating a reference sine wave, N−1 phase shifters coupled to the reference sine wave generating means for developing N−1 phase-shifted versions of the reference generator output, wherein the reference sine wave generating means and the phase shifters together generate a succession of N reference sine waves each displaced $2\pi/N$ electrical degrees with respect to successive reference sine waves and N summing junctions each receiving one of the succession of N reference sine waves and a current signal so that the summing junctions develop N error signals which are used to derive the N PWM waveforms; and a plurality of switching circuits, each of which is coupled to an AC power line and controlled by the PWM waveform associated with such power line for compensating the AC line current whereby undesired harmonics therein are reduced.

23. An electromagnetic interference (EMI) reduction circuit for reducing harmonics in N-phase AC power carried on a set of power lines caused by rectification of the N-phase AC power by a rectifier circuit, comprising:

first means for developing a set of N current signals representing the current in each of the power lines;

second means coupled to the first developing means for developing a set of N pulse width modulated (PWM) waveforms from the set of current signals, each having a duty cycle dependent upon the current in an associated one of the power lines; and a plurality of switching circuits, each of which is coupled to an AC power line and controlled by the PWM waveform associated with such power line for compensating the AC line current whereby undesired harmonics therein are reduced, each switching circuit including a transformer and a pair of switches, the transformer having a primary winding including two ends each coupled to the output of the rectifier circuit and a secondary winding coupled to one of the AC power lines.

24. The EMI reduction circuit of claim 22, wherein the reference sine wave generating means comprises a phase-locked loop controlled by a current signal having an output coupled to a variable-gain amplifier.

25. The EMI reduction circuit of claim 21, wherein each reference sine wave generating means comprises a phase-locked loop controlled by a current signal having an output coupled to a variable-gain amplifier.

* * * * *